United States Patent [19]

Cox et al.

[11] 3,776,143

[45] Dec. 4, 1973

[54] RAILWAY PASSENGER VEHICLE STEP AND DOOR CONSTRUCTION

[75] Inventors: John M. Cox, Calumet Park; Robert J. Kunst, Chicago, both of Ill.; Norman M. Szala, Hammond, Ind.

[73] Assignee: Pullman Incorporated, Chicago, Ill.

[22] Filed: Oct. 14, 1971

[21] Appl. No.: 189,303

[52] U.S. Cl.................. 105/343, 105/398, 105/443
[51] Int. Cl......................... B61d 19/00, B61d 23/02
[58] Field of Search ........... 105/443-450, 422, 377, 105/343, 397, 398; 280/163, 164

[56] References Cited
UNITED STATES PATENTS

| | | | |
|---|---|---|---|
| 403,176 | 5/1889 | Brown, Jr. ........................... | 105/343 |
| 2,067,579 | 1/1937 | Pflager................................ | 105/398 |
| 1,476,960 | 12/1923 | Elliott................................. | 105/343 |

*Primary Examiner*—Gerald M. Forlenza
*Assistant Examiner*—Richard A. Bertsch
*Attorney*—Hilmond O. Vogel et al.

[57] ABSTRACT

A railway passenger vehicle step and side skirt arrangement including a door receiving portion and having beam members secured to the corner posts and side sill of the vehicle body to form a reinforced corner structure wherein the steps are concealed completely from the elements when the door is in a closed position thereby keeping the stairs free of debris.

8 Claims, 7 Drawing Figures

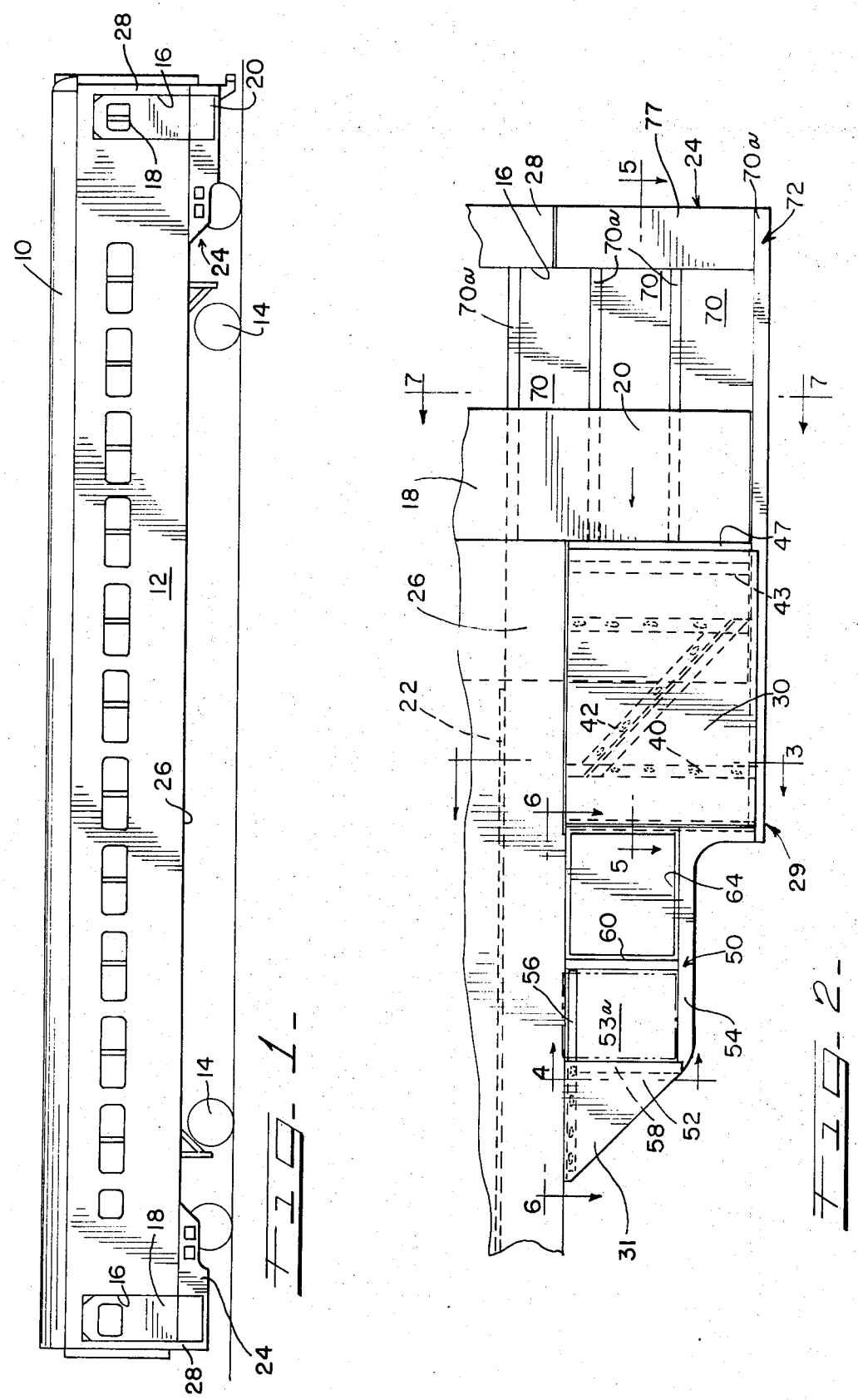

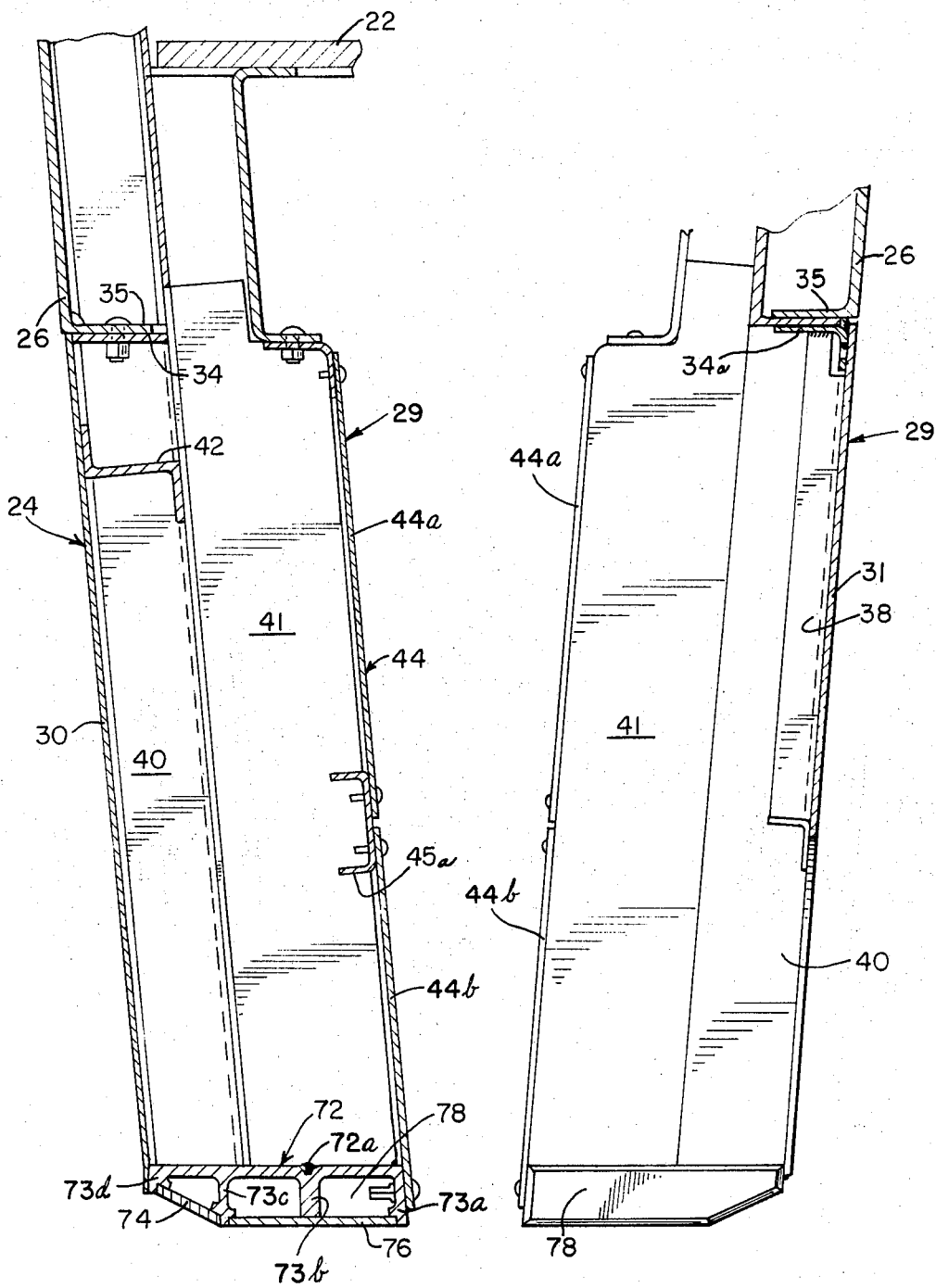

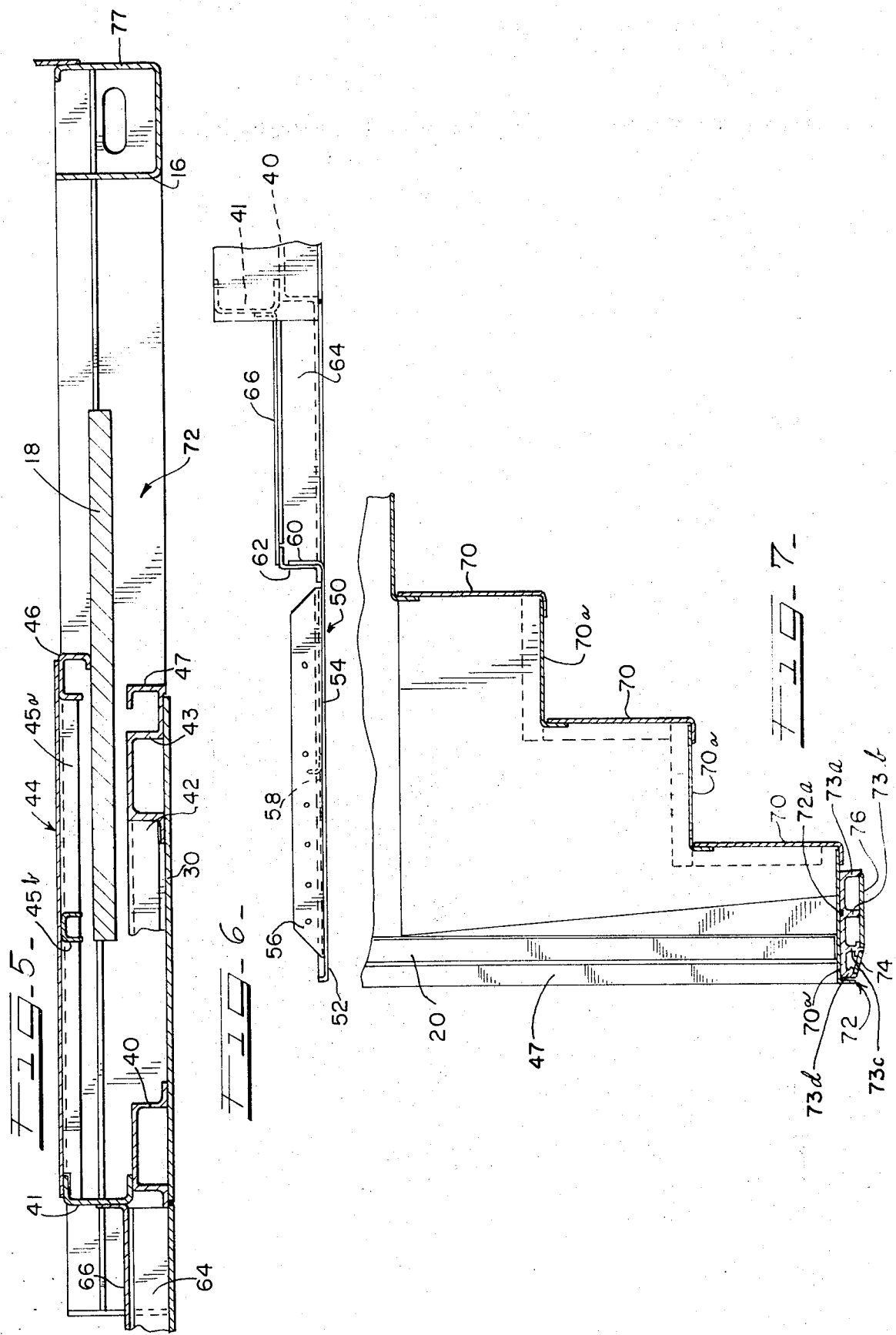

RAILWAY PASSENGER VEHICLE STEP AND DOOR CONSTRUCTION

BACKGROUND OF THE INVENTION

1. Field of the invention

The present invention pertains to a railway passenger vehicle and in particular the corner portion of the vehicle which includes the steps and the movable conductor's platform.

2. Description of the prior art

Prior art railway passenger vehicles having sliding doors generally terminate the doors at the floor level thereby leaving the stair or step area open sometimes resulting in a clogging of the stairs by air-borne debris and occasionally rendering the stairs dangerous by an accumulation of snow or ice. The present invention includes a door extending downwardly beyond the floor level and receivable within a reinforced skirt section which prevents a build up of debris on the stairs and keeps the stairs safe for passenger usage. The side skirt and door receiving portion also include reinforced structural members which communicate between the corner posts and the vehicle side sill to form a reinforced section at each corner of the vehicle body.

SUMMARY

This invention is applied to a railway passenger vehicle to provide a step assembly for ingress and egress wherein the steps are protected from the elements and thereby kept clean by a sliding door having a lower, step protecting, portion. The lower portion of the door is receivable in a skirt section assembly which depends from the side sill of the vehicle and connects the side sill with the corner posts to thereby form a reinforced side corner section. Panel sections are also provided for use as access doors to auxiliary equipment.

These and other objects of the invention will become apparent from reference to the following description, appended claims and attached drawings.

BRIEF DESCRIPTION OF THE DRAWINGS

FIG. 1 is a side elevational view of a railway passenger vehicle;

FIG. 2 is a removed portion of the corner section of the vehicle illustrated in FIG. 1 and greatly enlarged for purposes of clarity;

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 2;

FIG. 6 is a sectional view taken along line 6—6 of FIG. 2; and

FIG. 7 is another sectional view taken along line 7—7 of FIG. 2.

DESCRIPTION

Referring to the drawings and in particular to FIG. 1 there is illustrated the usual railway passenger vehicle 10 having a car body unit 12 supported on longitudinally spaced truck members 14. Door openings 16 are positioned at each of the four corners of the vehicle body 12. Each door opening may be completely closed off by a sliding door 18 which includes a lower door portion 20 extending below the level of the passenger supporting floor 22. A step and side skirt assembly 24 extends downwardly at each of the four corners of the vehicle from the side sill 26. Each corner of the vehicle is reinforced by a corner post 28 which joins the end and side assemblies rigidly together.

Referring now in particular to FIGS. 2 through 7 the novel side skirt and step arrangement of the present invention will be discussed. The step and skirt assembly 24 includes a door storage portion 29 having outer cover sheets 30, 31 comprising essentially a thin sheet member rigidly secured to reinforcing posts. Connecting plates 34, 34a are fastened atop this outer reinforced portion to provide for a connection between the bottom flange plate 35 of the side sill 26 and the outer cover portions 30, 31 of the side skirt assembly. Sheet member 31 is attached to and reinforced by vertically extending angle member 38. The cover plate 34 extends between the post member 40 and the spaced channel member 43. Cover plate 34a extends from members 40, 41 towards the middle of the vehicle 10 to the termination of the skirt assembly 24. A Z-shaped diagonally extending reinforcing member 42 connects the hat shaped members 40 and 43 and provides a reinforced section therein.

The interior side of the car skirt portion has an inner skin 44 which includes a pair of adjacent individual sheet members 44a, 44b which are fastened by means of the channel shaped connecting and reinforcing member 45a. A vertically extending channel reinforces this inner skin 44 and is best illustrated in FIG. 5 and designated as 45b. Spaced about the opening which provides for movement and storage of the door 18 are a pair of guide clip members 46 and 47 which also provide mounting and attaching surfaces for the sheet members 30 and 44.

Adjacent this door storage portion is a skirt end portion designated by the numeral 50 and best illustrated in FIG. 2. The skirt end portion 50 provides for a structurally sound transition between the door storage section 29 and the side sill 26, and also accommodates access to equipment such as pipeing and valve and control means which may be concealed under this skirt end portion. An end triangular portion 52 provides the terminating transition piece between the side step and skirt assembly and the side sill. Positioned towards the end of the car 12 and away from member 52 is a hinged access door 53a which permits concealment of valves or electrical connectors which may be used in servicing equipment. Surrounding these openings is an outer skin member 54 having a top portion connected to an angle member 56 and attached to a vertically extending reinforcing angle member 58. The outer skin 54 also includes an inwardly extending flange portion 60 for attachment to the Z-shaped angle connecting and reinforcing member 62 (see FIG. 6). A Z-shaped angle member 64 extends along the bottom portion of the opening 53a and thereby forms a connection between an inner wall portion 66 which forms the rear of the box shaped opening 53b.

The door opening 16 which is traversed by the sliding door 18 contains the usual stair assembly having vertically and horizontally interconnected stair members 70, 70a respectively to provide for efficient movement of passengers into and from the vehicle. Extending beneath and reinforcing and sup-porting the bottom horizontally extending stair member 70a is a step support extrusion 72 having an electric heater strip to prevent ice formation and also having finger members 73a, 73b, 73c, 73d extending outwardly and downwardly therefrom and receiving cover plates 74, 76 to thereby form an enclosed beam having hollow portions for structural integrity and light weight. By extruding the main body portion and completing the cross section by welding cover plate members thereto an economical member having virtually any required cross section may be formed. The support extrusion 72 is a continuous member extending between the corner post extension 77, which is fixedly attached thereto, and the bottom portion of the reinforcing channel member 41 and post member 40 to thereby form a structurally sound connection between the corner posts 28 and the door receiving and storing portion 29 of the step and skirt assembly 24. Therefore it is noticed that the corner is additionally reinforced by the step and skirt assembly 24 by virtue of this support extrusion 72 which communicates between the reinforced door receiving portion and the vehicle corner posts 28.

Thus, it has been disclosed that a side step and skirt assembly 24 having reinforced portions and including a step support extrusion 72 communicating between the vehicle corner posts 28 and the door receiving well portion will thereby produce a reinforced vehicle corner and utilize the strength of the step assembly and the door receiving well portion to reinforce the corner of the vehicle. Also, the present invention permits the stairwell to be completely closed by the sliding door 18 thereby preventing debris and snow or ice from accumulating in the stairwell and creating a dangerous or otherwise undesirable condition.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a railway passenger vehicle having a side sill member disposed along each side and longitudinally spaced door members positioned at the vehicle end portions adjacent corner posts and having door lower portions extending below the side sill member, said vehicle having a step and side skirt assembly including:

step means adjacent an associated corner post;

an extruded step support means having means connected to said corner post and abutting the step means in a supportive relationship;

a door storage compartment depending downwardly from said side sill and having a lower portion connected to said extruded step support means and having sheet means and reinforcing members extending between the step support means and the side sill thereby providing said door storage compartment for the door lower portions;

a skirt end portion including sheet members and reinforcing angle members forming a transition means between the door storage portion and the adjacent side sill member.

2. The invention according to claim 1, and:
   said skirt end portion having access door panel means contained thereon.

3. The invention according to claim 1, and:
   said door storage compartment having rein-forced wall sheet members spaced about a hollow portion wherein the door moves;
   door guide posts attached to the sheet members and adjacent the door opening.

4. The invention according to claim 1, and:
   said door lower portion including a bottom portion adjacent the step support means in sealing relationship.

5. The invention according to claim 1, and:
   said door storage compartment including connecting plate means abutting the associated side sill thereby forming a structural beam means of the door storage compartment for vehicle reinforcement.

6. The invention according to claim 1, and:
   said side skirt assembly having post portions extending upwardly from said step support means to form a lower portion of the associated corner post.

7. The invention according to claim 1, and:
   said step support means having a step abutting portion and depending finger members.

8. The invention according to claim 7, and:
   reinforcing plate means extending between the depending finger members to define hollow beam means.

* * * * *